United States Patent [19]
Wickett

[11] Patent Number: 6,156,828
[45] Date of Patent: Dec. 5, 2000

[54] RUBBER BASE ASPHALT EMULSION METHOD

[76] Inventor: Steve R. Wickett, 2901 Avenue J, Santa Fe, Tex. 77510

[21] Appl. No.: 09/179,015

[22] Filed: Oct. 26, 1998

Related U.S. Application Data

[63] Continuation of application No. 08/770,125, Dec. 19, 1996, Pat. No. 5,827,568, which is a continuation of application No. 08/570,739, Dec. 12, 1995, abandoned.

[51] Int. Cl.$^7$ .................................................. C08L 95/00
[52] U.S. Cl. ........................... 524/60; 524/61; 524/251; 524/253; 524/340; 524/446; 521/42; 521/445; 106/277; 106/473; 106/476
[58] Field of Search ................... 521/42, 44.5; 524/253, 524/340, 446, 251, 252, 61, 60; 106/277, 473, 476

[56] References Cited

U.S. PATENT DOCUMENTS

| | | | |
|---|---|---|---|
| 2,377,052 | 5/1945 | Stover | 521/42 |
| 2,458,222 | 1/1949 | Talales | 521/42 |
| 2,841,060 | 7/1958 | Coppage | 94/23 |
| 3,253,521 | 5/1966 | Endres | 94/23 |
| 3,338,849 | 8/1967 | Johnson | 524/68 |
| 3,513,005 | 5/1970 | Bradshaw et al. | 427/128 |
| 3,635,863 | 1/1972 | Drukker | 524/69 |
| 3,778,397 | 12/1973 | Gannon et al. | 427/138 |
| 3,891,585 | 6/1975 | McDonald | 427/138 |
| 3,919,148 | 11/1975 | Winters et al. | 427/138 |
| 4,018,730 | 4/1977 | McDonald | 524/60 |
| 4,068,023 | 1/1978 | Nielsen et al. | 427/138 |
| 4,086,291 | 4/1978 | Svensson | 524/64 |
| 4,137,204 | 1/1979 | McDonald | 524/70 |
| 4,548,735 | 10/1985 | Bock et al. | 252/312 |
| 4,548,962 | 10/1985 | Lindmark | 523/220 |
| 4,560,482 | 12/1985 | Canevari | 210/749 |
| 4,609,696 | 9/1986 | Wilkes | 524/59 |
| 5,414,029 | 5/1995 | Lemoine et al. | 524/60 |
| 5,539,029 | 7/1996 | Burris | 524/60 |
| 5,711,796 | 1/1998 | Grzybowski et al. | 106/277 |
| 5,811,477 | 9/1998 | Burris et al. | 524/60 |

FOREIGN PATENT DOCUMENTS

| | | |
|---|---|---|
| 0604258 | 6/1994 | European Pat. Off. . |
| 2581392 | 11/1986 | France . |
| 2174708 | 11/1986 | United Kingdom . |

OTHER PUBLICATIONS

G. Holleran, "Cape Seals—History and Development, Design and Performance," Valley Slurry Seal Company presentation/brochure, pp. 1–15 (followed by 5 pages of diagrams/tables) (Jan. 1996).

G. Holleran, et al., "Chipsealing Using Emulsions—Australian and New Zealand Developments," pp. 1–21 (followed by 5 pages of diagrams/tables) (Date and Source Unknown).

G. Holleran, "The Use of Polymer Modifications in Slurry Surfacings," Valley Slurry Seal Company presentation/brochure, pp. 1–7 (followed by 7 pages of diagrams/tables) (1996).

L. Lewandswski, "Polymer Modifiers Changing the Face of Hot Mix," Asphalt Contractor, Article downloaded from Internet Web Site (www.asphalt.com/ACJan. 1996 (Jan. 1996).

C.J. Potgieter, et al., "Bitumen–Rubber Asphalts and Seals—A Report on Full Scale Applications" (Date and Source Unknown).

J.R. Reed, et al., "Quality Assurance of Slurry and Microsurfacing Projects," (Date and Source Unknown).

J.N. Rogers, et al., "Topdressing with Crumb Rubber from Used Tires on Athletic Fields and Other High–Traffic Turf Areas," Article downloaded from Michigan State University Internet Web Site (www.css.msu.edu) (Date Unknown).

R. Veizer, "Design of a Crumb Rubber Modified Asphalt Pavement Using the Stone Mastic Asphalt Concept," Article downloaded from Carleton University Civil Engineering Internet Web Site (www.civeng.carl...acts) (Date Unknown).

"Scrap Rubber Bitumen Guide," VicRoads (Western Australis) brochure (Date Unknown).

Author Unknown, *"Scrap Tire Utilization Technologies,"* Information Series 116, Sponsored by National Asphalt Pavement Association and State Asphalt Pavement Association Executives, pp. i–30 (Date Unknown).

Jon A. Epps, Ph.D., "Uses of Recycled Rubber Tires in Highways," National Cooperative Highway Research Program, Synthesis of Highway Practice (National Academy Press, Washington, D.C., 1994).

Author Unknown, *"Hisotry of Use of Crumb Rubber in Asphalt Paving Materials,"* pp. 4–3—4–8 (Date Unknown).

*Primary Examiner*—Peter A. Szekely
*Attorney, Agent, or Firm*—Mark R. Wisner

[57] ABSTRACT

A gel-like emulsion containing natural rubber and crumb rubber from used vehicle tires which may be added to an asphalt paving emulsion at ambient temperature for chip coating, slurry sealing, microsurfacing, soil stabilization or pavement recycling.

14 Claims, No Drawings

RUBBER BASE ASPHALT EMULSION METHOD

This application is a continuation application of application Ser. No. 08/770,125, filed Dec. 19, 1996, now issued as U.S. Pat. No. 5,827,568, which is a continuation of application Ser. No. 08/570,739, filed Dec. 12, 1995, now abandoned

BACKGROUND OF THE INVENTION

1. Field of the Invention

This invention relates to roadway paving materials and more particularly to an emulsion for adding rubber to asphalt paving material.

The benefits of adding rubber to asphalt paving were first proposed in the middle of the last century; however, it was not until about the middle of the present century that the idea of adding vehicle tire rubber to asphalt was developed and crumb rubber from vehicle tires was added. Crumb rubber in an asphalt emulsion proved to be elastic and flexible and is used as a crack sealer with satisfactory results.

It has been found that the use of crumb rubber from scrap vehicle tires added to asphalt also improves road durability. It is now a requirement that pavement asphalt contain a predetermined percentage of recycled rubber as the percentage of the total tons of asphalt laid which is financed in whole or in part by a Federal Assistance Program.

Most asphalts are products of the distillation of crude petroleum and range from hard and brittle-like solids to almost water-thin liquids. Asphalt cement is the basis of these products and may be liquefied for construction purposes by heating, adding solvents, or an emulsifier. Adding diesel fuel to base asphalt results in a product called "cut-back". The use of emulsions rather than cut-backs results in substantial fuel savings.

Asphalt dispersed in water with an emulsifier forms an emulsion.

The purpose of the emulsifier is dispersion of asphalt cement in water for pumping, prolonged storage and mixing. The emulsion should "break" quickly when it comes in contact with aggregate in a mixer or sprayed on a roadbed. When cured, the residual asphalt retains all the adhesive, durability, and water-resistant properties of the asphalt cement from which it was produced.

In the general method for emulsifying asphalt, concurrent streams of molten asphalt cement and water containing an emulsifying agent are directed by a positive displacement pump into a colloid mill and divided into tiny droplets by intense shear stress.

To accomplish its ultimate function of cementing and waterproofing, the asphalt must separate from the water phase. In "breaking" asphalt droplets coalesce and produce a continuous film of asphalt on the aggregate or pavement.

This invention provides a rubber containing emulsion easily added to substantially any conventional asphalt emulsion.

2. Description of the Prior Art

The most pertinent patents are believed to be U.S. Pat. No. 4,018,730 issued Apr. 19, 1977 to McDonald for METHOD FOR EMULSIFYING ASPHALT-RUBBER PAVING MATERIAL AND A STABLE THIXOTROPIC EMULSION OF SAID MATERIAL; and, U.S. Pat. No. 4,137,204 issued Jan. 30, 1979 to McDonald for CATIONIC METHOD FOR EMULSIFYING ASPHALT-RUBBER PAVING MATERIAL AND A STABLE THIXOTROPIC EMULSION OF SAID MATERIAL. U.S. Pat. No. 4,018,730 discloses a method requiring heat and an alkali hydroxide-asphalt emulsifier mixture, where the asphalt emulsifier is a resin, tall oil fatty acid, oleic acid, stearic acid, animal protein, or casein, for emulsifying an asphalt and reclaimed rubber pavement repair material into a thixotropic emulsion capable of flowing as a liquid upon agitation. U.S. Pat. No. 4,137,204 substantially discloses the same emulsion as a base and adds an asphalt-rubber soap containing a cationic water soluble emulsifying agent.

This invention is distinctive over these patents by forming an asphalt modifying emulsion, mixed under ambient temperature and containing a relatively high percentage of reclaimed rubber that may be added to and mixed with, under ambient temperature, substantially any known asphalt paving material mix containing less than a predetermined required percentage of rubber for increasing the rubber content thereof.

SUMMARY OF THE INVENTION

This emulsion contains equal parts by weight of rubber and solvent forming a base total for calculating the quantities of the remaining ingredients, consisting of: water; a nonionic emulsifier; binders; an antistripping agent; and, color.

All ingredients are mixed at ambient temperature before adding and commingling the crumb rubber with the emulsion.

The principal object of this invention is to provide an emulsion containing a relatively high percentage of rubber which may be added to substantially any asphalt emulsion under ambient temperature or up to 150° F. (66° C.) to increase the rubber content thereof to a predetermined percentage.

DESCRIPTION OF THE PREFERRED EMBODIMENT

This crumb rubber asphalt modifying emulsion consists of equal parts by weight of a solvent and crumb rubber. The total parts by weight of these two ingredients equal a 100% base for calculating the quantities of the remainder of the formula which comprises; an emulsifying agent; an antistripping agent; binders; and, color.

The solvent is an aliphatic solvent, preferably SHELL SOL 340HT, a complex combination of predominately C9 and C12 hydrocarbons, available from Shell Oil Co. This solvent tends to dissolve natural and synthetic rubber small size particles reclaimed from discarded vehicle tires and swells and softens the larger size particles of crumb rubber. The preferred size of the crumb rubber particles is 25–50 mesh.

The quantity of water used is 30–40% of the base weight.

The emulsifying agent comprising 10–15% of the base weight is a nonionic ethoxylated nonphyenol. A first binder, comprising 5% of the base weight is a clay mineral containing silicon and aluminum, marketed under the trademark IMVITE IGB, by Industrials Minerals Ventures, 2030 East Flamingo, Las Vegas, Nev. 89119.

An antistripping agent binder comprising 1–2% of the base weight, is aliphatic amines (polyamines), commonly known by the trademark NRD BOTTOMS which enhances asphalt sticking to a roadbed and retards asphalt bleeding through a chip seal wearing surface; 1–2% of the base weight of atactic polyproplene powder, commonly known as PPA; and 1–2% of the base weight of a selected color such as carbon black.

A preferred example of the emulsion consists of 100 pounds (45 kg) of the solvent; 100 pounds (45 kg) of rubber; 60 pounds (27 kg) of water; 4 pounds (1.8 kg) of nonionic emulsifier; 5 pounds (2.25 kg) IMVITE IGB; 2 pounds (0.9 kg) each of NRD BOTTOMS; PPA; and black color for a total of 275 pounds.

The quantity of each of the principal ingredients, solvent and rubber, may be varied from 3 to 7 parts by weight to achieve the base weight. The quantity of the remaining ingredients of the formula may be 3 to 4 parts by weight of water; emulsifying agent 1.5 parts by weight; binder IMVITE IGB ½ part by weight; and the three remaining ingredients as follows: antistripping agent, PPA and color, each ¹/₁₀ to ⅕ part by weight.

The invention has been described in conjunction with preferred embodiments and variations thereof and it seems obvious that various changes such as substitution of equivalents and other alterations may be made in the formula while maintaining a preferred quantity of crumb rubber.

I claim:

1. A method of preparing an emulsion for adding rubber to asphalt material comprising the steps of:
   (a) mixing 3 to 7 parts by weight of an aliphatic solvent with 3 to 4 parts by weight of water at ambient temperature to form a solvent/water emulsion;
   (b) admixing 1 to 1.5 parts by weight of a nonionic ethoxylated nonylphenol as an emulsifying agent, ¹/₁₀ to ½ part by weight each of atactic polypropylene and a clay mineral, and ¹/₁₀ to ⅕ part by weight of an aliphatic amine with the solvent/water emulsion at ambient temperature to form an aqueous gel emulsion; and
   (c) admixing 3 to 7 parts by weight of crumb rubber at ambient temperature with the aqueous gel emulsion.

2. The method of preparing an emulsion for adding rubber to asphalt material of claim 1 wherein the crumb rubber mixed with the aqueous gel emulsion comprises particles of 25–50 mesh.

3. The method of claim 1 wherein the clay mineral contains silicon and aluminum.

4. An emulsion for adding crumb rubber to an asphalt emulsion at temperatures ranging from ambient temperature up to 150° F. comprising:
   a base weight comprised of an aliphatic solvent and crumb rubber mixed in a ratio ranging from 3:7 to 7:3 parts by weight;
   an emulsifying agent comprising 10–15% of the weight of said base weight;
   a binder comprising 5% of the weight of said base weight;
   an anti-stripping agent comprising 1–2% of the weight of said base weight; and
   water comprising 30–40% of the weight of said base weight,
   said emulsifying agent, binder, anti-stripping agent, and water being mixed with said base weight of aliphatic solvent and crumb rubber at ambient temperature before addition to an asphaltic material.

5. The emulsion of claim 4 additionally comprising atactic polypropylene in an amount comprising 1–2% by weight of said base weight.

6. The emulsion of claim 4 wherein said emulsifying agent is a nonionic emulsifying agent.

7. The emulsion of claim 4 wherein said aliphatic solvent and said crumb rubber are mixed in equal parts.

8. A composition prepared by adding crumb rubber to an asphalt emulsion in accordance with the method of claim 4.

9. A method of preparing a crumb rubber emulsion for addition to an asphaltic material comprising the steps of:
   mixing an aliphatic solvent and crumb rubber in a ratio ranging from 3:7 to 7:3 parts by weight to form a base weight;
   adding an emulsifying agent comprising 10–15% of the weight of the base weight;
   adding an anti-stripping agent comprising 1–2% of the weight of the base weight; and
   adding water comprising 30–40% of the weight of the base weight,
   the emulsifying agent, binder, anti-stripping agent, and water being mixed with the base weight at ambient temperature before addition to an asphaltic material.

10. The method of claim 9 additionally comprising adding a binder comprising 5% of the weight of the base weight.

11. The method of claim 9 additionally comprising adding the mixture of base weight, emulsifying agent, binder, stripping agent, and water to an asphaltic material at a temperature ranging from ambient temperature up to 150°.

12. A composition prepared by adding a crumb rubber emulsion prepared in accordance with the method of claim 11 to asphaltic material.

13. The method of claim 9 wherein the emulsifying agent is nonionic.

14. A crumb rubber emulsion for addition to an asphaltic material prepared by the method of claim 9.

* * * * *